US006996532B2

(12) United States Patent
Thomas

(10) Patent No.: US 6,996,532 B2
(45) Date of Patent: Feb. 7, 2006

(54) METHOD AND APPARATUS FOR ACCESSING A CONTENT SITE WITH A SOUND SEQUENCE

(75) Inventor: Andrew Thomas, Atherton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 524 days.

(21) Appl. No.: 10/005,379

(22) Filed: Dec. 4, 2001

(65) Prior Publication Data

US 2002/0107693 A1 Aug. 8, 2002

(30) Foreign Application Priority Data

Dec. 7, 2000 (GB) .................................. 0029799

(51) Int. Cl.
| | | |
|---|---|---|
| G10L 21/00 | (2006.01) | |
| G06F 15/16 | (2006.01) | |
| H04M 1/64 | (2006.01) | |
| H04M 11/00 | (2006.01) | |

(52) U.S. Cl. ................ 704/270; 379/88.17; 379/88.18; 379/88.24; 709/219
(58) Field of Classification Search ............ 704/270.1, 704/270; 379/88.18, 88.24, 339, 88.17, 93.18
See application file for complete search history.

(56) References Cited

U.S. PATENT DOCUMENTS

| 5,613,056 | A | | 3/1997 | Gasper et al. ............... 395/173 |
|---|---|---|---|---|
| 5,761,280 | A | | 6/1998 | Noonen et al. .......... 379/93.27 |
| 5,945,989 | A | | 8/1999 | Freishtat et al. ............ 345/329 |
| 5,953,392 | A | | 9/1999 | Rhie et al. ................ 379/88.13 |
| 6,049,835 | A | * | 4/2000 | Gagnon ....................... 709/245 |
| 6,061,738 | A | * | 5/2000 | Osaku et al. ................ 709/245 |
| 6,061,793 | A | | 5/2000 | Tewfik et al. ................ 713/176 |
| 6,163,803 | A | | 12/2000 | Watanabe .................... 709/217 |
| 6,243,443 | B1 | | 6/2001 | Low et al. ................ 379/88.17 |
| 6,607,136 | B1 | | 8/2003 | Atsmon et al. ............. 235/492 |
| 6,654,741 | B1 | * | 11/2003 | Cohen et al. ................... 707/6 |
| 6,718,015 | B1 | * | 4/2004 | Berstis ..................... 379/88.17 |
| 6,721,741 | B1 | | 4/2004 | Eyal et al. ..................... 707/10 |
| 6,724,868 | B2 | * | 4/2004 | Pradhan et al. .......... 379/90.01 |
| 6,738,827 | B1 | * | 5/2004 | Abir ........................... 709/245 |
| 6,760,697 | B1 | | 7/2004 | Neumeyer et al. .......... 704/201 |

(Continued)

FOREIGN PATENT DOCUMENTS

EP 0 847 179 A2 6/1998

(Continued)

OTHER PUBLICATIONS

Abstract of Japanese Patent No. 11-119974, published Apr. 30, 1999, 1 page.

*Primary Examiner*—W. R. Young
*Assistant Examiner*—Brian Albertalli

(57) ABSTRACT

A browser with a sound input receives a sound sequence that can be used to access a content site. The sound sequence encodes characters according to a predetermined scheme. These characters are extracted by the browser and may either directly constitute the URL of the content site, or include a site code that can be translated into the content site URL by a service system. In this latter case, the browser contacts the service system to have the site code translated into the content site URL. Once in possession of the content site URL, the browser contacts that site. Where the encoded characters represent a site code requiring translation, the URL of the translation service system is preferably included in the set of encoded characters with the encoding being such that the URL encodes to a musical tune.

21 Claims, 4 Drawing Sheets

U.S. PATENT DOCUMENTS

2002/0107596 A1    8/2002   Thomas et al. ............... 700/94
2002/0107942 A1    8/2002   Thomas et al. ............. 709/219

FOREIGN PATENT DOCUMENTS

| EP | 1 047 004 A2 | 10/2000 |
| JP | 11-110319 | 4/1999 |
| JP | 11-119974 | 4/1999 |
| KR | 2000-0017854 | 4/2000 |
| WO | 97/26733 | 7/1997 |
| WO | 00/22772 | 4/2000 |
| WO | 00/50984 | 8/2000 |
| WO | 01/86451 A1 | 11/2001 |

* cited by examiner

METHOD AND APPARATUS FOR ACCESSING A CONTENT SITE WITH A SOUND SEQUENCE

FIELD OF THE INVENTION

The present invention relates to a method and arrangement for accessing a content site using information encoded sound signals.

BACKGROUND OF THE INVENTION

In recent years there has been an explosion in the number of services available over the World Wide Web on the public internet (generally referred to as the "web"), the web being composed of a myriad of pages linked together by hyperlinks and delivered by servers on request using the HTTP protocol. Each page comprises content marked up with tags to enable the receiving application (typically a GUI browser) to render the page content in the manner intended by the page author; the markup language used for standard web pages is HTML (HyperText Markup Language).

However, today far more people have access to a telephone than have access to a computer with an Internet connection. Sales of cellphones are outstripping PC sales so that many people have already or soon will have a phone within reach where ever they go. As a result, there is increasing interest in being able to access web-based services from phones. 'Voice Browsers' offer the promise of allowing everyone to access web-based services from any phone, making it practical to access the Web any time and any where, whether at home, on the move, or at work.

Indeed, because many items around the home and office have a sound capability, it is attractive to use sound, not only for passing information to/from/between humans, but also for passing functional information such as URLS, to and between items of equipment. JP 11-119974 (Sony) describes various ways of using sound URLs, these being DTMF sound sequences that decode to character URLs.

A disadvantage of audible sound URLs is that they are generally highly unattractive to humans as they posses a fairly random structure of sound (or so it appears to the human ear). Whilst it is possible to hide sound data such as URLs in other, pleasanter sounds using sound watermarking techniques, this generally requires complex embedding and retrieval systems which is expensive.

It is an object of the present invention to provide improved sound URLs and methods for their usage.

SUMMARY OF THE INVENTION

According to one aspect of the present invention, there is provided a method of accessing a content site comprising the steps of:

(a) receiving a sound-sequence signal representing a sound sequence with sound features that serve to encode characters according to a predetermined scheme, at least some of the sound sequences encoding character sequences that comprise site codes intended to be translated to a content site URI by a service system;

(b) decoding the received sound-sequence signal to derive a character sequence;

(c) where the character sequence derived in step (b) includes a said site code, sending the site code to the service system for translation; and (d) receiving back from the service system the content site URI corresponding to said site code, and using it to access the content site.

According to another aspect of the present invention, there is provided apparatus for accessing a content site comprising the steps of:

first means for receiving a sound-sequence signal representing a sound sequence with sound features that serve to encode characters according to a predetermined scheme, at least some of the sound sequences encoding character sequences that comprise site codes intended to be translated to a content site URI by a service system;

second means for decoding the received sound-sequence signal to derive a character sequence;

third means operative where the character sequence derived by the second means includes a said site code, to send the site code to the service system for translation; and fourth means for receiving back from the service system the content site URI corresponding to said site code, and using it to access the content site.

BRIEF DESCRIPTION OF THE DRAWINGS

A method and arrangement embodying the invention, for accessing content sites, will now be described, by way of non-limiting example, with reference to the accompanying diagrammatic drawings, in which.

BEST MODE OF CARRYING OUT THE INVENTION

Figure 1:
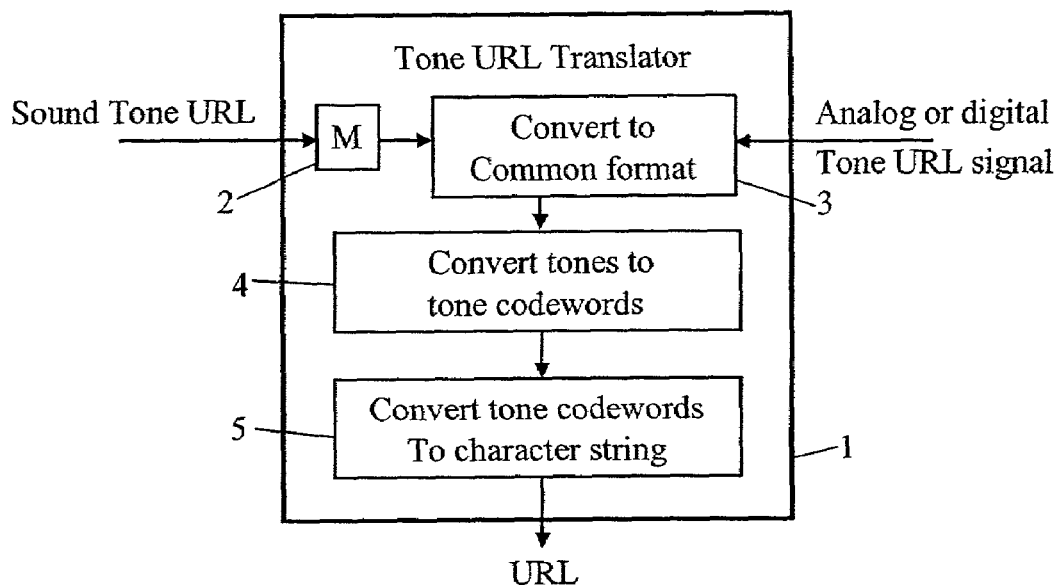
FIG. 1 is a block diagram showing the main functional blocks of a tone URL translator.

FIG. 1 depicts a tone URL translator 1 for receiving a sequence of tones that encode the characters of an URL. The tones are received as sound through microphone 2 but may also be received in analogue or digital electrical signal form. A converter 3 converts the received tone signals into a common internal format before passing the tone signals to a unit 4 that determines the frequencies of the received tones and generates corresponding respective tone codewords. These sound codewords are supplied to unit 5 where they are converted into a URL character string according to a predetermined mapping process.

Figure 2:
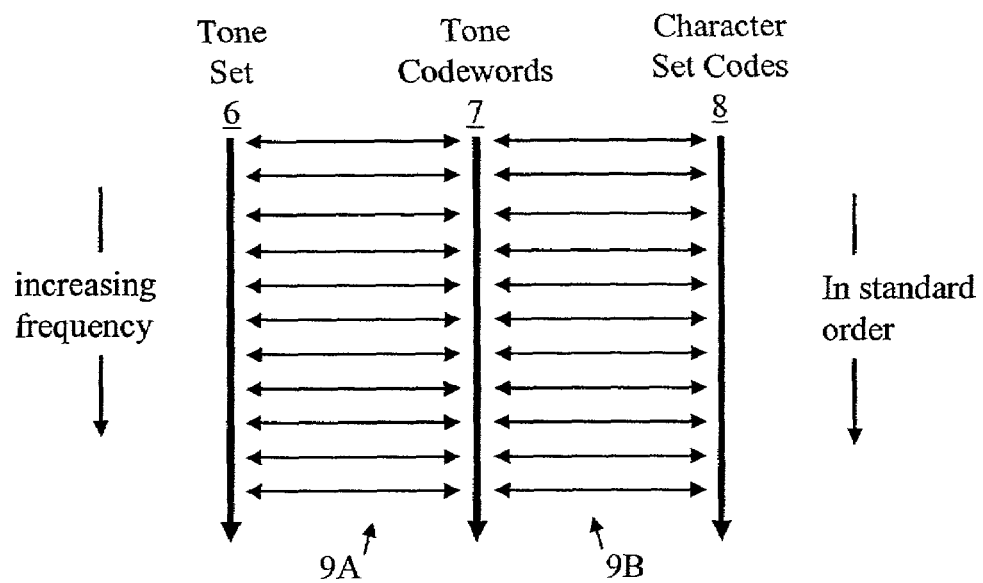
FIG. 2 is a diagram illustrating the mapping between tones and characters for a first tone-URL encoding/decoding scheme.

FIG. 2 shows a first mapping scheme for converting between tones and character codes. In this example, there is a one-to-one correspondence between tones and character codes—that is, each tone maps to one character code. In FIG. 2, the left-hand column shows the set of available tones 6 in increasing order of frequency, the center column corresponds to the set of tone codewords 7 arranged in increasing codeword value, and the right-hand column is the set of character codes in standard order (for example, the ASCII character code set arranged in increasing order of binary value).

Moving from a tone to a character code (or vice versa) involves two mappings, namely a first mapping 9A between tone and tone codeword, and a second mapping 9B between tone codeword and character code. The overall mapping between tones and character codes is a combination of the two mappings 9A and 9B. In the FIG. 2 example, both mappings 9A and 9B are simple one-to-one mappings with the values on each side of the mappings both increasing/ decreasing as the sets 6,7 and 8 are progressed through.

Implementing the FIG. 2 scheme using the FIG. 1 translator involves the unit 4 carrying out the mapping 9A and unit 5 carrying out the mapping 9B.

Whilst the foregoing mapping of FIG. 2 is extremely simple and therefore easy to implement, it suffers from the disadvantage that the sequence of tones produced when any particular URL is encoded, is likely to be unpleasant to the human ear.

Figure 3:
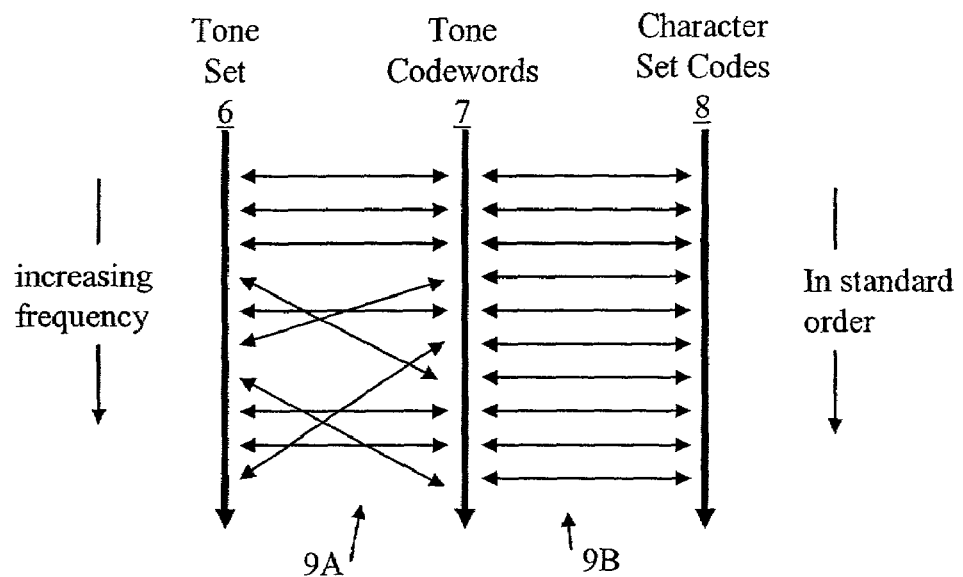
FIG. 3 is a diagram illustrating the mapping between tones and characters for a second tone-URL encoding/ decoding scheme.

To alleviate this, a modified mapping is used, one example modified mapping being illustrated in FIG. 3. In this example, the mapping 9A between tones and tone codewords is modified such that the overall mapping between tones and character codes results in frequently used character combinations of URLs producing pleasant sound sequences (that is, sequences of a musical character where "musical" is to be understood broadly, including chimes and the like). The character combinations so encoded are, for example, the generic top level domain names and "www".

The mapping 9B could alternatively or additionally have been modified to produce the desired musical sequences.

It is also possible to choose a mapping that gives a musical sequence for a complete URL.

In the foregoing encoding/decoding schemes, there is a one-to-one correspondence between tones and character codes and, as a consequence, it is possible to omit one of the mappings 9A/9B and have tones mapping directly to character codes. However, using intermediate tone codewords gives a degree of flexibility permitting improved encoding.

Figure 4:
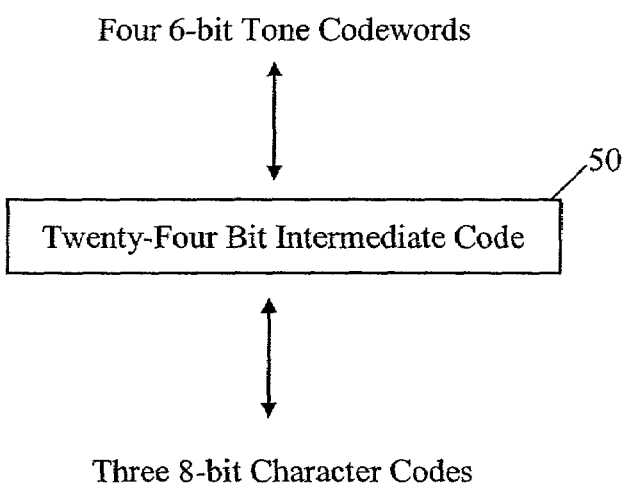
FIG. 4 is a diagram illustrating a preferred conversion scheme between characters and sound codewords.

More particularly, if the character set has 256 characters, then producing 256 tones within the frequency band of a telephone voice circuit (over which it may be desired to pass sound URLs), means that the resultant tones are very close together. It is preferable to have a smaller number of tones—for example 64 tones. However, to efficiently code characters in this case requires that each group of three characters is encoded by four tones. How this can be conveniently done is illustrated in FIG. 4 where each of three characters is represented by an 8-bit code. These codes are concatenated to form an intermediate 24-bit word 50. Word 50 is then split into four 6-bit tone codewords; the 6 bits permit 64 possible tone codewords which therefore provide an efficient representation of the 64 tones.

FIG. 4 represents a four-to-three mapping between tone codewords and character codes (mapping 9B), the mapping 9A between tones and tone codewords remaining a one-to-one in this example (though this can be varied). With this encoding scheme, it is more complicated to determine the details of the mapping (for example, mapping 9A) required to generate pleasant tone sequences for particular character groups since the characters must be considered in groups of three. However, since the main target character groups (generic top level domain names) are three-character groups and since leading spaces can be used to ensure that each such group is taken as a whole during the encoding process, determining a mapping for producing pleasant sounds for a small set of character combinations is a manageable task.

Whilst the mappings used by block 4 and 5 can conveniently be effected using simple look-up tables stored in memory, it is possible to use other mappings arrangements; for example, at least where only a small number of character combinations are required to encode to musical sequences, it will generally be possible to find transformation functions that can be calculated to derive the desired mappings.

It will be appreciated that the encoding process by which URL characters are converted to tone sequences is the reverse of the above-described decoding processes carried out by translator 1 and can be effected by appropriate decoding apparatus.

Rather than the above-described sound sequences encoding URLs, they can alternatively be used to encode URNs (Uniform Resource Names); in general terms, the sound sequences encode URIs (Uniform Resource Indentifiers).

Figure 5:
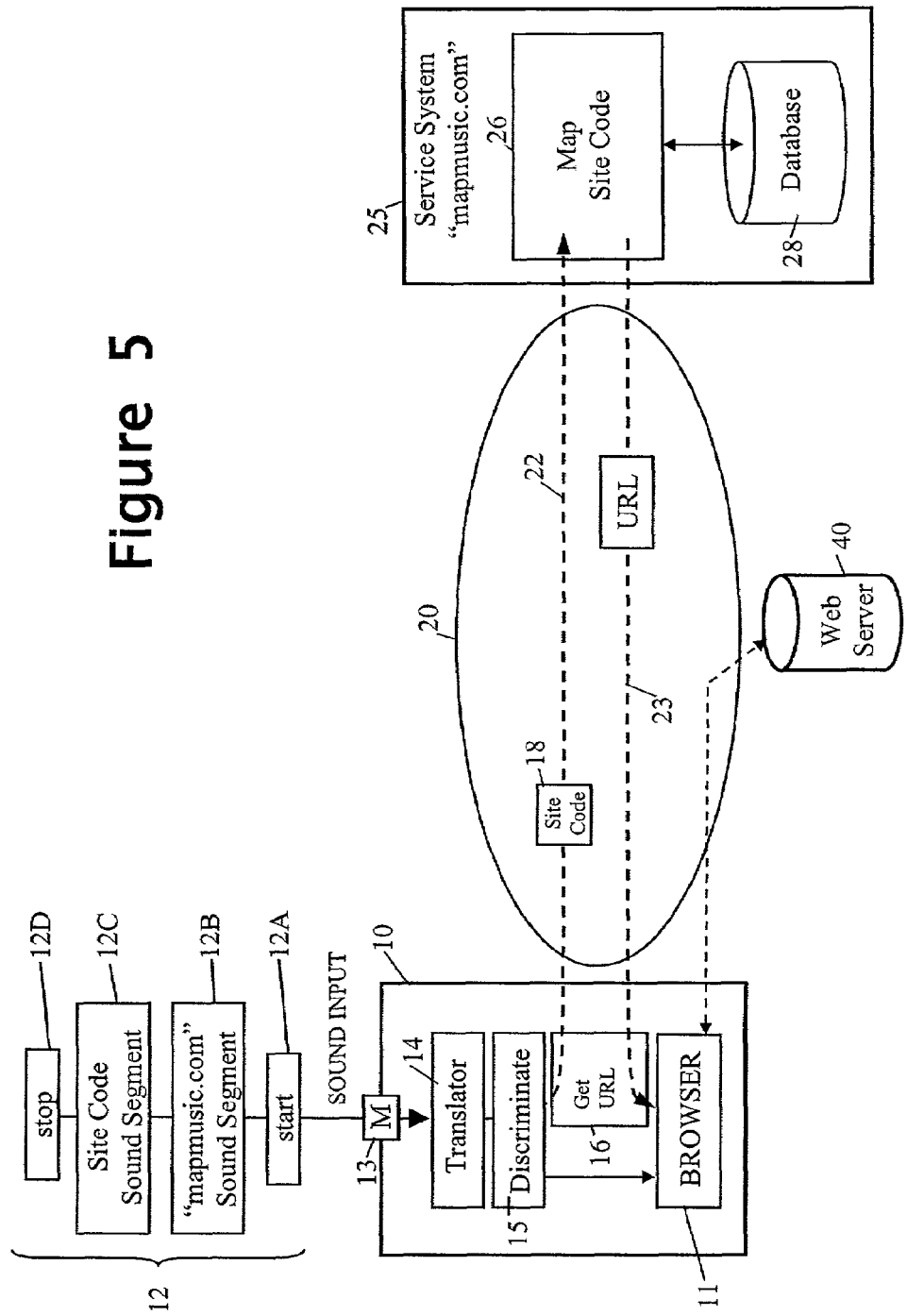
FIG. 5 is a diagram showing the use of a service system to translate site codes to site URLs.

FIG. 5 shows an arrangement which also enables pleasant tone sequences to be used to pass URLs; as will be seen, this arrangement preferably, but not necessarily, makes use of tone-character mappings such as depicted in FIG. 3 which associate pleasant tone sequences with common character sequences.

More particularly, end-user equipment 10 has a web browser 11 which can be used to contact web sites over the internet 20. Equipment 10 is provided with a sound input microphone 13 for receiving sound sequences 12 which represent, or can be used to obtain, website URLs. The sound sequences are constituted by tone sequences representing characters according to mappings such as illustrated in FIGS. 2, 3 and 4. The sound sequence signals from microphone 13 are passed to translator 14, which is similar in form to translator 1 of FIG. 1, and the resultant character sequences are fed to a discriminator unit 15. The role of this unit 15 is to determine whether a received character sequence represents a general URL (in which case it is passed to browser 11 for use in accessing the corresponding website), or whether it represents a site code intended to be translated into a URL; in the present example, service system 25 with URL "mapmusic.com" provides such a translation service.

The sound sequence 12 depicted in FIG. 5 corresponds to the input of a site code. The sound sequence is made up of four segments, namely a "start" segment 12A which can be a special character sequence indicating the start of a sequence, a sound segment 12B that encodes characters indicating that a site code is being provided, a sound segment 12C encoding the site code itself, and a stop segment indicating the end of the sequence 12. The start and stop codes would typically also be used to delimit a tone sequence directly encoding a URL.

When the discriminator sees the characters indicative of a site code, it knows that the next set of characters constitutes the site code and this code requires translation into a URL. The indicator characters can, in fact, be the URL of the translation service system—in this example "mapmusic.com".

The discriminator 15 next passes the site code to unit 16 which proceeds to contact service system 25 over the internet 20 (see arrow 22), passing it the site code 18. A map-site-code block 26 at service system 25 does a simple database lookup in database 28 to convert the site code into the corresponding site URL which it then returns to the unit 16 (see arrow 23). Unit 23 then passes the URL to browser 11 which uses it to contact the website concerned—in this case, website 40.

The FIG. 5 arrangement permits the use of site codes chosen because they sound pleasant when encoded into sound, the corresponding code characters being of little relevance provided they are unique. Furthermore, if the mapping used in the encoding scheme has been selected such that both the start and stop segments, as well as the "mapmusic.com" URL all have pleasant sounds, then the sound sequence 12 will be acceptable to the human ear regardless of the site being pointed to.

In the same way as the sound sequences supplied to translator 1 in FIG. 1 can represent URIs rather than just URLs, the service system can be arranged to translate site codes into URIs rather than URIs.

Figure 6:
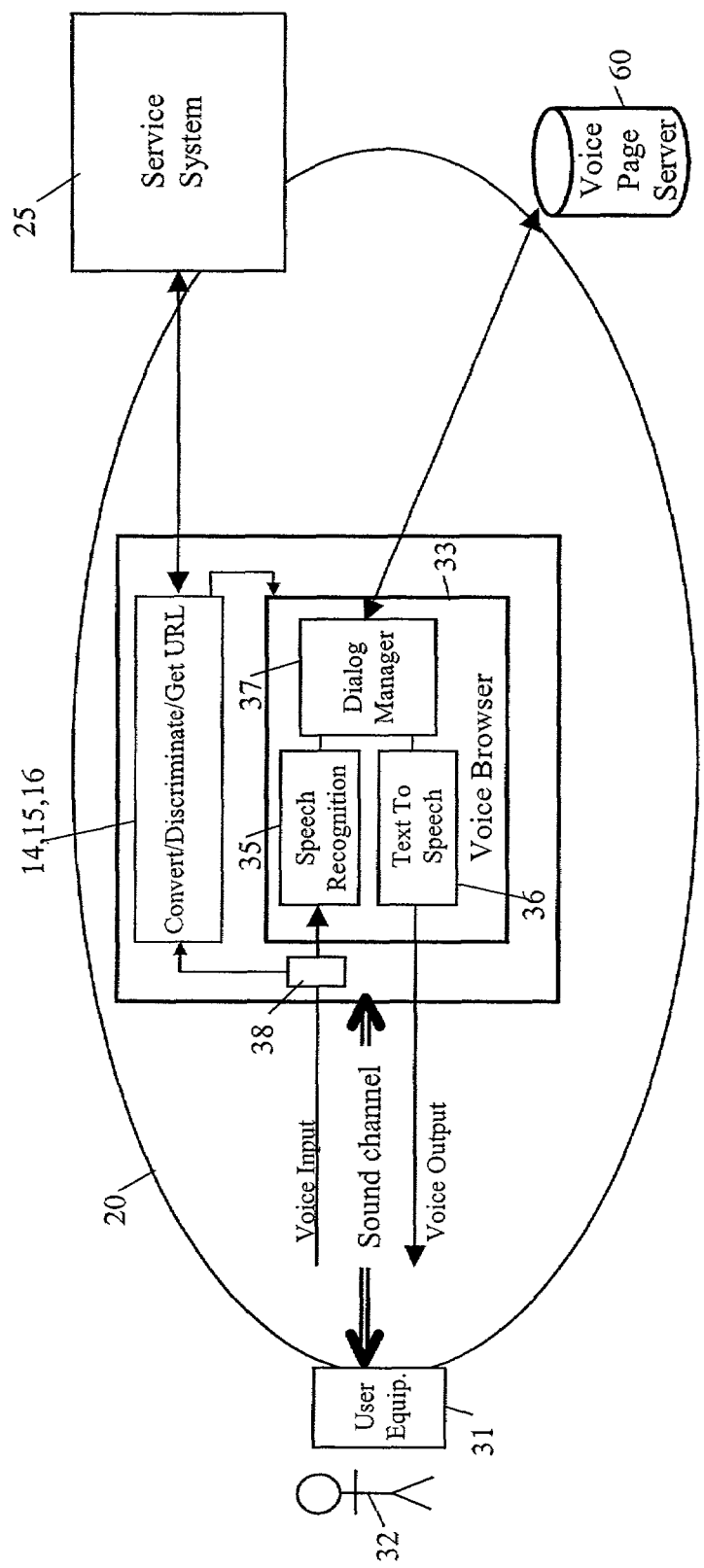
FIG. 6 is a diagram showing the use of the FIG. 5 service system by a network voice browser.

FIG. 6 shows a variation of the FIG. 5 arrangement in which the functionality of equipment 10 is incorporated into a voice browser 33 located in the communications infrastructure (for example, provided by a PSTN or PLMN operator or by an ISP). A voice browser allows people to access the Web using speech and is interposed between a user 32 and a voice page server 60. This server 60 holds voice service pages (text pages) that are marked-up with tags of a voice-related markup language (or languages). When a page is requested by the user 32, it is interpreted at a top level (dialog level) by a dialog manager 37 of the voice browser 33 and output intended for the user is passed in text form to a Text-To-Speech (TTS) converter 36 which provides appropriate voice output to the user. User voice input is converted to text by speech recognition module 35 of the voice browser 33 and the dialog manager 37 determines what action is to be taken according to the received input and the directions in the original page. Whatever its precise form, the voice browser can be located at any point between the user and the voice page server; in the present case, it is shown as located in the communications infrastructure.

The sound channel between the user's equipment 31 (for example, a mobile phone) and the voice browser 33 permits a tone-encoded character sequence be passed to the browser. This tone sequence is intercepted by unit 38 and passed to functionality corresponding to units 14, 15 and 16 in FIG. 5. If the tone sequence includes a general URL this is passed to the browser for action, whereas if the tone sequence includes a site code, the service system is accessed to determine the corresponding URL, the latter being returned and passed to the browser.

In both the arrangements of FIGS. 5 and 6, the unit 16 preferably includes a cache which is used to store the site codes and their corresponding URLs received back from the service system 25. In this case, before the unit 16 accesses service system to get a translation of a newly-received site code, it first checks its cache to see if it already has the required URL in cache—if it does, the URL is passed to the browser without the service system being accessed.

Many variants are, of course, possible to the arrangements described above. For example, whilst the sound features used to represent the codewords 7 have been tones in the foregoing examples, the codewords could be used to produce a different type of sound feature, such as:

tone combinations;
occurrence of maximum sound output power in predetermined frequency bands;
changes in output frequency;
different modulation frequencies of one or more tones.

Furthermore, the sound features can occur not only sequentially as described, but also in overlapping relation provided that it remains possible to determine character sequencing on decoding of the sound URL.

It is, of course, possible to arrange that every sound sequence received by the user equipment 10 of FIG. 5 includes a site code and, in this case, the discriminator 15 is no longer needed for discriminating between character sequences representing general URLs and those holding site codes.

What is claimed is:

1. A method of accessing a network-connected content site comprising the following steps carried out at a network browser:
   (a) receiving a sound-sequence signal representing sound sequences with sound features that encode a character sequence according to a predetermined scheme, the character sequence comprising two groups of characters, one of which is a site code intended to be translated to a content-site URI by a remote service system and the other of which comprises the address of the service system, the nature of the sound features and of the predetermined scheme being such that a sound sequence of a musical character represents the address of the service system;
   (b) decoding the received sound-sequence signal to derive a said character sequence;
   (c) detecting said two groups of characters in the character sequence with detection of said other group being taken as indicating that the site code formed by said one group is to be sent to the service system for translation; and
   (d) sending the site code to the service system at its address indicated by said other group of characters, receiving back the corresponding content-site URI, and using it to access the content site.

2. A method according to claim 1, wherein the said other group of characters comprises the URI of the service system.

3. A method according to claim 2, wherein the URI of the service system is a URL.

4. A method according to claim 1, wherein the nature of the sound features and of the predetermined encoding scheme is such that a sound sequence of a musical character represents said one group of characters.

5. A method according to claim 1, wherein in step (b) said sound features are decoded into corresponding sound codewords which are then mapped to characters.

6. A method according to claim 5, wherein the sound features comprise one of:
   fixed-frequency tones or tone combinations;
   occurrence of maximum sound output power in predetermined frequency bands;
   changes in output frequency;
   different modulation frequencies of one or more tones.

7. A method according to claim 1, wherein the steps of the method are carried out by a voice browser.

8. A method according to claim 1, including the further step of caching the correspondence of site code to site URI, step (c) involving checking this cache before contacting the service system.

9. A method according to claim 1, wherein the content site URI is a URL.

10. A method according to claim 1, wherein the steps of the method are carried out by end-user equipment.

11. A method according to claim 1, wherein the service system is connected to the internet and step (d) involves communicating with the service system over the internet.

12. A method according to claim 1, further comprising the initial step of receiving said sound sequence and converting it into said sound sequence signal.

13. A method of accessing a network-connected content site with a network browser, said method comprising:
- receiving a sound-sequence signal representing sound sequences with sound features that encode a character sequence according to a predetermined scheme, the character sequence comprising a service-system address and a site code indicative of said content site, the nature of the sound features and of the predetermined scheme being such that a sound sequence of a musical character represents said service-system address;
- decoding the received sound-sequence signal to derive said character sequence;
- detecting the site code and service-system address in said character sequence;
- sending the site code to a service system at said service-system address; and
- receiving back from the service system a content-site URI corresponding to said site code, and
- using the received content-site URI to access said content site.

14. A method according to claim 13, wherein the service-system address is in the form of an URI.

15. A method according to claim 14, wherein the nature of the sound features and of the predetermined encoding scheme is such that a sound sequence of a musical character represents said site code.

16. A method of encoding content-site access information, comprising:
- generating a character sequence comprising two groups of characters, one of which is a content site code intended to be translated to a content-site URI by a service system and the other of which comprises the address of the service system; and
- generating a sound-sequence signal representing sound sequences with sound features that encode said character sequence according to a predetermined scheme, the nature of the sound features and of the predetermined scheme being such that a sound sequence of a musical character represents said service-system address.

17. A method according to claim 16, wherein the service-system address is in the form of an URI.

18. A method according to claim 16, wherein the nature of the sound features and of the predetermined encoding scheme is such that a sound sequence of a musical character represents said site code.

19. Apparatus for encoding content-site access information, the apparatus comprising:
- a character-sequence generator arranged to form a character sequence comprising two groups of characters, one of which is a content site code intended to be translated to a content-site URI by a service system and the other of which comprises the address of the service system; and
- a sound-signal generator arranged to generate a sound-sequence signal representing sound sequences with sound features that encode said character sequence according to a predetermined scheme, the nature of the sound features and of the predetermined scheme being such that a sound sequence of a musical character represents said service-system address.

20. Apparatus according to claim 19, wherein the service-system address is in the form of an URI.

21. Apparatus according to claim 19, wherein the nature of the sound features and of the predetermined encoding scheme is such that a sound sequence of a musical character represents said site code.

* * * * *